United States Patent
Kolb et al.

(10) Patent No.: US 10,618,165 B1
(45) Date of Patent: *Apr. 14, 2020

(54) TOOLTIP STABILIZATION

(71) Applicant: X Development LLC, Mountain View, CA (US)

(72) Inventors: Michael Kolb, Palo Alto, CA (US); Jeff Linnell, Woodside, CA (US); Anthony Sean Jules, Oakland, CA (US)

(73) Assignee: X Development LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/176,102

(22) Filed: Oct. 31, 2018

Related U.S. Application Data

(63) Continuation of application No. 15/673,182, filed on Aug. 9, 2017, now Pat. No. 10,144,128, which is a continuation of application No. 15/003,526, filed on Jan. 21, 2016, now Pat. No. 9,757,859.

(51) Int. Cl.
*B25J 9/16* (2006.01)
*B25J 9/00* (2006.01)

(52) U.S. Cl.
CPC .......... *B25J 9/1638* (2013.01); *B25J 9/0096* (2013.01); *B25J 9/1697* (2013.01); *Y10S 901/09* (2013.01)

(58) Field of Classification Search
USPC ......... 700/245–264; 318/568.1, 568.11, 560, 318/567; 901/4, 29, 42, 47
See application file for complete search history.

(56) References Cited

U.S. PATENT DOCUMENTS

| | | | |
|---|---|---|---|
| 4,969,108 A | * 11/1990 | Webb | ............ B25J 9/1684 219/124.34 |
| 5,053,876 A | 10/1991 | Blissett et al. | |
| 5,709,410 A | 1/1998 | Reeves, Jr. | |
| 5,727,132 A | * 3/1998 | Arimatsu | ............ G05B 19/4083 700/259 |
| 5,834,917 A | * 11/1998 | Yasui | ............ B25J 9/1633 318/568.11 |

(Continued)

FOREIGN PATENT DOCUMENTS

| | | |
|---|---|---|
| CN | 103822631 | 5/2014 |
| CN | 203825466 | 9/2014 |
| WO | WO 2009026642 | 3/2009 |

*Primary Examiner* — Jonathan L Sample
(74) *Attorney, Agent, or Firm* — Fish & Richardson P.C.

(57) ABSTRACT

Robotic control systems and methods may include providing an end effector tool of a robotic device configured to perform a task on a work surface within a worksite coordinate frame. Unintended movement over time of the end effector tool with respect to the work surface and with respect to the worksite coordinate frame may be determined based on image data indicative of the work surface, first location data indicative of a first location of the end effector tool with respect to the worksite coordinate frame, and second location data indicative of a second location of the end effector tool with respect to the work surface. One or more control signals for the robotic device may be adjusted in order to counteract the unintended movements of the end effector tool with respect to the work surface and worksite coordinate frame.

20 Claims, 8 Drawing Sheets

(56) References Cited

U.S. PATENT DOCUMENTS

| | | | | |
|---|---|---|---|---|
| 5,910,719 A * | 6/1999 | Thorne | B25J 9/1692 | 318/560 |
| 5,987,591 A * | 11/1999 | Jyumonji | B25J 9/1697 | 700/259 |
| 6,044,308 A * | 3/2000 | Huissoon | B25J 9/1692 | 700/166 |
| 6,292,715 B1 * | 9/2001 | Rongo | B25J 9/1664 | 318/568.1 |
| 6,430,472 B1 * | 8/2002 | Boillot | G05B 19/056 | 219/121.61 |
| 6,434,449 B1 * | 8/2002 | De Smet | B25J 9/1692 | 318/568.1 |
| 6,615,112 B1 * | 9/2003 | Roos | B25J 9/1692 | 318/568.1 |
| 6,765,569 B2 * | 7/2004 | Neumann | G06T 7/80 | 345/419 |
| 7,161,321 B2 * | 1/2007 | Ban | B25J 9/1692 | 318/560 |
| 7,298,385 B2 * | 11/2007 | Kazi | B25J 9/1671 | 345/633 |
| 7,376,262 B2 | 5/2008 | Hu et al. | | |
| 7,467,026 B2 | 12/2008 | Sakagami et al. | | |
| 7,801,364 B2 * | 9/2010 | Urban | G08B 13/19671 | 382/232 |
| 8,108,072 B2 | 1/2012 | Zhao et al. | | |
| 8,160,746 B2 | 4/2012 | Wang et al. | | |
| 8,406,922 B2 * | 3/2013 | Nemmers | B25J 9/1692 | 700/182 |
| 8,442,661 B1 * | 5/2013 | Blackwell | B25J 9/1689 | 700/245 |
| 8,954,183 B2 * | 2/2015 | Kayani | B23K 26/03 | 700/114 |
| 9,505,128 B1 * | 11/2016 | Kesil | B25J 9/163 | |
| 9,616,564 B2 * | 4/2017 | Pfaff | B25J 9/0081 | |
| 9,744,665 B1 * | 8/2017 | Linnell | B25J 5/007 | |
| 9,757,859 B1 * | 9/2017 | Kolb | B25J 13/089 | |
| 10,144,128 B1 * | 12/2018 | Kolb | B25J 9/0096 | |
| 2003/0144765 A1 * | 7/2003 | Habibi | B25J 9/1697 | 700/259 |
| 2004/0111185 A1 * | 6/2004 | Gmeiner | B23K 26/0884 | 700/245 |
| 2004/0172164 A1 * | 9/2004 | Habibi | B25J 9/1692 | 700/245 |
| 2005/0107920 A1 * | 5/2005 | Ban | B25J 9/1692 | 700/245 |
| 2005/0195975 A1 * | 9/2005 | Kawakita | H04L 9/0822 | 380/30 |
| 2005/0225278 A1 * | 10/2005 | Ban | B25J 9/1692 | 318/568.11 |
| 2005/0273199 A1 * | 12/2005 | Ban | B25J 9/1682 | 700/248 |
| 2005/0275727 A1 | 12/2005 | Lai et al. | | |
| 2006/0070558 A1 * | 4/2006 | Chiu | B60R 25/1004 | 109/2 |
| 2007/0040818 A1 * | 2/2007 | Aoyanagi | H04N 21/23608 | 345/204 |
| 2007/0106306 A1 * | 5/2007 | Bodduluri | A61B 17/32053 | 606/133 |
| 2007/0168082 A1 | 7/2007 | Kim et al. | | |
| 2007/0285673 A1 * | 12/2007 | Kiley | B65G 25/02 | 356/614 |
| 2007/0287992 A1 * | 12/2007 | Diolaiti | G05B 19/19 | 606/1 |
| 2008/0082388 A1 | 4/2008 | Fishman | | |
| 2008/0252248 A1 * | 10/2008 | Lundberg | B25J 9/1692 | 318/572 |
| 2008/0300723 A1 * | 12/2008 | Ban | B25J 9/1692 | 700/259 |
| 2009/0069936 A1 * | 3/2009 | Kock | B23K 11/318 | 700/254 |
| 2009/0074979 A1 * | 3/2009 | Krogedal | G05B 19/404 | 427/427.2 |
| 2009/0118864 A1 * | 5/2009 | Eldridge | B25J 9/1692 | 700/259 |
| 2009/0145888 A1 * | 6/2009 | Hesse | B23K 26/04 | 219/121.64 |
| 2009/0240372 A1 * | 9/2009 | Bordyn | B25J 9/1692 | 700/259 |
| 2010/0080417 A1 | 4/2010 | Qureshi et al. | | |
| 2011/0029131 A1 * | 2/2011 | Ban | B25J 9/1697 | 700/254 |
| 2011/0029132 A1 * | 2/2011 | Nemmers | B25J 9/1692 | 700/254 |
| 2011/0043629 A1 * | 2/2011 | Owen | G08B 13/19671 | 348/143 |
| 2011/0173829 A1 * | 7/2011 | Pettersson | B25H 1/0021 | 33/503 |
| 2011/0257766 A1 | 10/2011 | Sundaram et al. | | |
| 2013/0035791 A1 * | 2/2013 | Chiu | B25J 9/1692 | 700/253 |
| 2013/0085595 A1 * | 4/2013 | Kiley | H01L 21/681 | 700/121 |
| 2013/0123982 A1 * | 5/2013 | Chiu | B25J 9/1692 | 700/254 |
| 2015/0022674 A1 * | 1/2015 | Blair | H04N 5/23222 | 348/207.1 |
| 2015/0197010 A1 | 7/2015 | Ruuspakka | | |
| 2015/0266183 A1 * | 9/2015 | Alifragkis | B25J 9/1692 | 700/254 |
| 2016/0022674 A1 | 1/2016 | Steggerda et al. | | |
| 2016/0059412 A1 * | 3/2016 | Oleynik | B25J 9/163 | 700/257 |
| 2016/0129588 A1 * | 5/2016 | Pfaff | B25J 9/0081 | 700/256 |
| 2016/0176015 A1 * | 6/2016 | Naderer | B24B 49/006 | 451/5 |
| 2016/0346923 A1 * | 12/2016 | Kesil | B25J 9/163 | |
| 2016/0350589 A1 * | 12/2016 | Chiu | G06K 9/00355 | |

* cited by examiner

TOOLTIP STABILIZATION

CROSS-REFERENCE TO RELATED DISCLOSURE

This application is a continuation of U.S. patent application Ser. No. 15/673,182, filed Aug. 9, 2017, which is a continuation of U.S. application Ser. No. 15/003,526 filed on Jan. 21, 2016, the contents of each are incorporated by reference.

BACKGROUND

Robotic systems may be used for applications involving material handling, welding, assembly, and dispensing, among others. Over time, the manner in which these robotic systems operate is becoming more intelligent, more efficient, and more intuitive. As robotic systems become increasingly prevalent in numerous aspects of modern life, the need for robotic systems capable of working autonomously in various environments becomes apparent. Therefore, a demand for such robotic systems has helped open up a field of innovation in robot parts, sensing techniques, as well as component design and assembly.

SUMMARY

In a worksite with robotic devices interacting with various objects, it is desirable to accurately track the location of the robotic devices and objects. Methods and systems for monitoring and controlling robotic systems are described herein. Example implementations may relate to a control system that is programmatically arranged to track the location of various objects or robotic devices throughout a worksite. The control system may also be arranged to stabilize an end effector tool mounted on a robotic arm of a robotic device. For example, by tracking the location of the end effector tool within the worksite and with respect to a work surface, the end effector tool may be manipulated to counteract detected undesired movements.

In one aspect, a method is described. The method may include providing an end effector tool mounted to a moveable component of a robotic device. The end effector tool may be configured to perform a task on a work surface within a worksite coordinate frame. The method may further include providing first location data indicating a first location of the end effector tool with respect to the work surface, providing second location data indicating a second location of the end effector tool within the worksite coordinate frame, and providing third location data indicating a third location of the end effector tool within the worksite coordinate frame. The second location data may be provided at a lower refresh rate than the first location data and may have a higher spatial resolution than the first location data. The third location data may be provided at a lower refresh rate than the second location data and may have a higher spatial resolution than the second location data. The method may further include tracking the location of the end effector tool based on the first, second, and third location data, and, based on the tracked location of the tool, instructing the robotic device to manipulate the end effector tool to perform a task on the work surface.

In another respect, a system is disclosed. The system may include an end effector tool mounted to a moveable component of a robotic device. The end effector tool may be configured to perform a task on a work surface within a worksite coordinate frame. The system may further include a first location measurement system configured to provide first location data indicating a first location of the end effector tool with respect to the work surface, a second location measurement system configured to provide second location data indicating a second location of the end effector tool within the worksite coordinate frame, and a third location measurement system configured to provide third location data indicating a third location of the end effector tool within the worksite coordinate frame. The second location data may be provided at a lower refresh rate than the first location data and may have a higher spatial resolution than the first location data. The third location data may be provided at a lower refresh rate than the second location data and may have a higher spatial resolution than the second location data. The system may further include a control system configured to track the location of the end effector tool based on the first, second, and third location data, and, based on the tracked location of the tool, instruct the robotic device to manipulate the end effector tool to perform a task on the work surface.

In a further respect, another method is provided. The method may include providing an end effector tool mounted to a moveable component of a robotic device. The end effector tool may be configured to perform a task on a work surface within a worksite coordinate frame. The method may further include receiving image data indicative of the work surface and determining, based on the image data, first movement information indicating unintended movement over time of the end effector tool with respect to the work surface. The method may further include receiving first location data indicating a first location of the end effector tool with respect to the worksite coordinate frame and determining, based on the first location data, second movement information indicating unintended movement over time of the end effector tool with respect to the worksite coordinate frame. The method may further include receiving second location data indicating a second location of the end effector tool with respect to the work surface and determining, based on the second location data, third movement information indicating unintended movement over time of the end effector tool with respect to the work surface. The method may further include determining, based on the first, second, and third movement information, one or more adjustments to one or more control signals for the robotic device in order to counteract the unintended movements of the end effector tool with respect to the work surface and worksite coordinate frame. The method may further include communicating instructions to the robotic device to operate in accordance with the one or more adjustments.

In yet a further aspect, another system is disclosed. The system may include an end effector tool mounted to a moveable component of a robotic device. The end effector tool may be configured to perform a task on a work surface within a worksite coordinate frame. The system may further include a control system configured to receive image data indicative of the work surface and determine, based on the image data, first movement information indicating unintended movement over time of the end effector tool with respect to the work surface. The control system may be further configured to receive first location data indicating a first location of the end effector tool with respect to the worksite coordinate frame and determine, based on the first location data, second movement information indicating unintended movement over time of the end effector tool with respect to the worksite coordinate frame. The control system may be further configured to receive second location data indicating a second location of the end effector tool with respect to the work surface and determine, based on the second location data, third movement information indicating unintended movement over time of the end effector tool with respect to the work surface. The control system may be further configured to determine, based on the first, second, and third movement information, one or more adjustments to one or more control signals for the robotic device in order to counteract the unintended movements of the end effector tool with respect to the work surface and worksite coordinate frame. The control system may be further configured to communicate instructions to the robotic device to operate in accordance with the one or more adjustments.

These as well as other aspects, advantages, and alternatives, will become apparent to those of ordinary skill in the art by reading the following detailed description, with reference where appropriate to the accompanying drawings.

DETAILED DESCRIPTION

Figure 1:
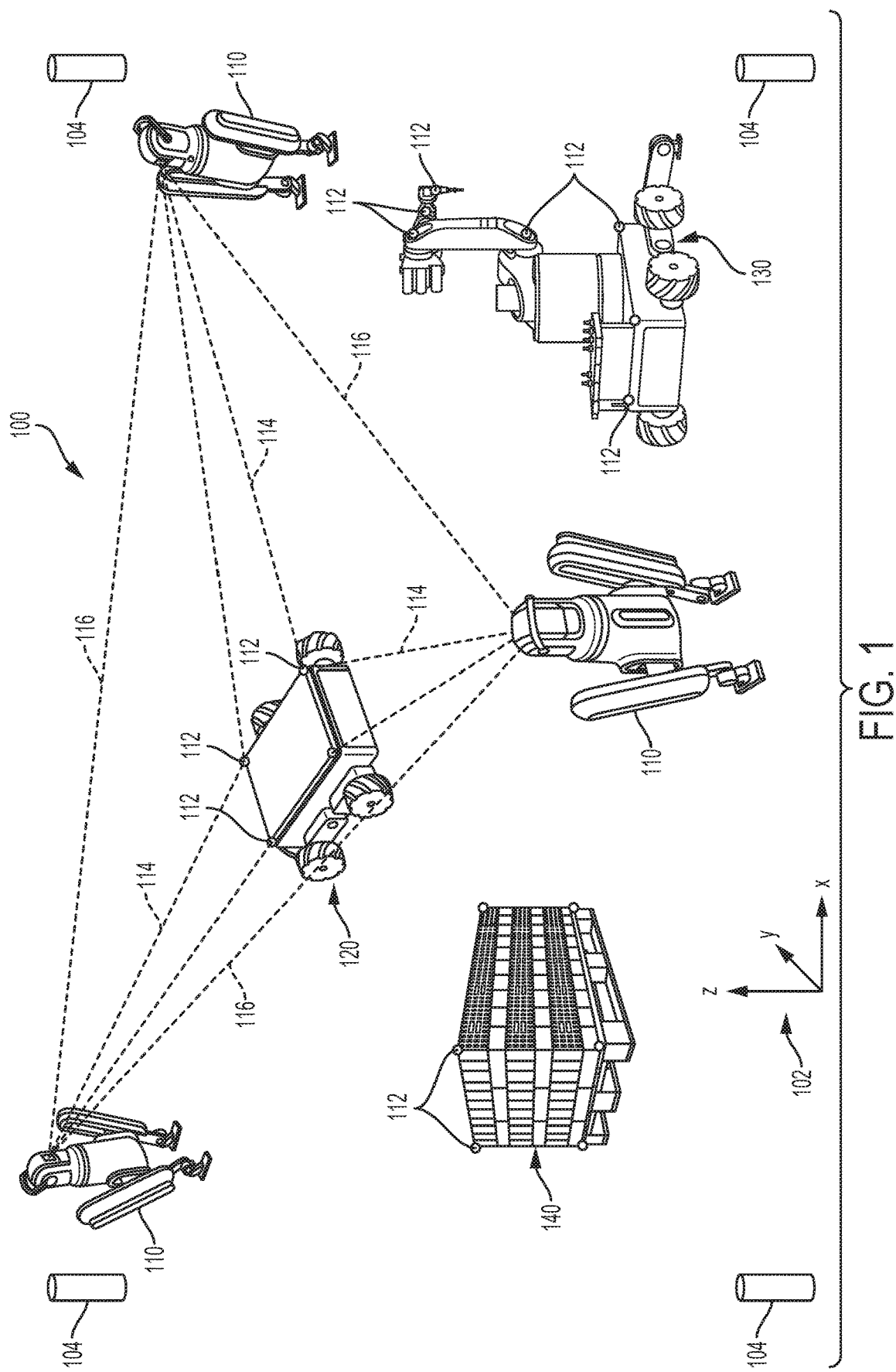
FIG. 1 depicts a worksite coordinate frame according to an example embodiment.

Exemplary methods and systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. In the figures, similar symbols typically identify similar components, unless context dictates otherwise. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. Overview

A worksite may include a number of robotic devices and various objects. The robotic devices may be configured to carry out various tasks by moving about the worksite and interacting with the objects. In order to most effectively control the robotic devices, it is desirable to track the positions of the robotic devices and various objects within the worksite and with respect to each other.

Illustrative implementations relate to a control system that tracks locations of target objects throughout a worksite. In particular, the control system may operate in a worksite, such as a construction site for instance, and in doing so, the control system may have sensors that provide position information for at least one target object within the worksite. These target objects may include robotic devices, components or linkages of robotic devices, tools, and/or construction materials, among other objects. In some embodiments, a target object may be, but is not limited to, an end effector tool mounted to a robotic arm of a worker robot. The worker robot may be configured to manipulate the end effector tool to perform a task on a work surface, such as drilling, milling, screwing, welding, gripping, etc. As such, the control system may dynamically track the location of the end effector tool within the worksite and with respect to the work surface to ensure that the end effector tool is performing a desired task.

The control system may include a number of global sensors for tracking the location of the end effector tool within a coordinate frame of the worksite. The global sensors may provide location data with high spatial accuracy, but at a low rate. The global sensors may include a laser tracker system, a motion capture system, a visual system, and/or a time-of-flight system for determining positions of markers in the worksite. The markers may be placed at various locations throughout the worksite to form the coordinate frame, and they may be attached to the target objects as well, such as the end effector tool. The global sensors may be located in fixed locations throughout the worksite, or they may be attached to moveable devices. For example, the global sensors may be attached to mobile observer robots capable of moving about the worksite.

The control system may further include a number of local sensors for tracking the location of the end effector tool with respect to the work surface. The local sensors may provide location data with a spatial accuracy lower than that of the global sensors, but at a higher rate. The local sensors may include a camera mounted on the robotic arm near the end effector tool for capturing video of the work surface. The captured video may be analyzed using optical flow processes to determine a position of the end effector tool with respect to the work surface. Since optical flow processes only provide two-dimensional positional information, multiple optical flow systems may be applied in different directions, or the local sensors may further include a distance sensor, such as a laser distance sensor, for determining a third dimension of the position of the end effector tool with respect to the work surface. The local sensors may further include an inertial measurement unit (IMU) mounted to or near the end effector tool. By integrating data from the IMU over time, the position of the end effector tool with respect to the work surface may be determined.

While the local sensors may facilitate determining the position of the end effector tool at a higher rate than the global sensors, the local sensors may have a lower spatial accuracy than the higher sensors because the position of the end effector tool is determined relative to the work surface. Consequently, the local sensors are subject to inaccuracies due to error accumulation and drift. Further, the local sensors may provide data with a lower spatial resolution than data from the global sensors. By determining the location of the end effector tool based on a combination of data provided by local and global sensors, the inaccuracies of the local sensor data may be reduced or removed.

Further, in some embodiments, the control system may stabilize the end effector tool based on data from the local and global sensors. By combining the data from the local and global sensors to determine the position of the end effector tool, the control system may determine that the end effector tool was moved in an undesired manner. For example, an undesired movement may be movement caused by vibrations, the robotic device sinking into the ground, or any other unintentional movement of the end effector tool. To stabilize the end effector tool, the control system may provide instructions to the robotic device to manipulate the end effector tool in a manner to counteract the undesired movement.

It should be understood that the above examples are provided for illustrative purposes, and should not be construed as limiting. As such, the method may additionally or alternatively include other features or include fewer features, without departing from the scope of the invention.

II. Example Systems and Methods

A. Example Worksite Coordinate Frame

FIG. 1 depicts a worksite coordinate frame 100, according to an example embodiment. The worksite coordinate frame 100 may define a portion of an environment in which objects, machines, and perhaps humans may be located. The worksite coordinate frame 100 may take on a three-dimensional form and may be used for various purposes. For instance, the worksite coordinate frame 100 may be defined for a construction site where the construction of a building or another project is being or is about to be carried out.

While various aspects of the disclosure are discussed below in the context of a construction site, example implementations are not limited to construction sites and may extend to a variety of other worksite coordinate frames, such as retail spaces, manufacturing facilities, distribution facilities, office spaces, shopping centers, festival grounds, and/or airports, among other examples. Additionally, while one worksite coordinate frame 100 is shown in FIG. 1, example implementations may be carried out in the context of a number of worksite coordinate frames.

As depicted in FIG. 1, the worksite coordinate frame 100 includes a number of observer robots 110, a mover robot 120, a worker robot 130, and construction materials 140.

The construction materials 140 may be any materials or tools located in a construction site. For example, in FIG. 1, the construction materials 140 are depicted as a palette of bricks. Other examples of construction materials 140 may include, but are not limited to: drywall, screws, nails, mortar, cement, water, soil, gravel, glass, metal framing, metal sheets, bonding materials, landscaping materials, etc.

The worker robot 130 may be a robotic device configured to perform a task within the worksite coordinate frame 100. In the illustrated scenario, the worker robot 130 includes an end effector tool mounted to a robotic arm. The end effector tool may be configured to perform a task on a work surface, such as drilling, milling, welding, nailing, riveting, sanding, spraying, gripping, or any other task typically performed during construction of a building. Further, the robotic arm of the worker robot 130 may include a mount to which different types of end effectors can be attached. As such, different end effectors may be swapped out such that the worker robot 130 can perform different types of tasks. Further, the worker robot 130 may be capable of moving throughout the worksite. For example, as depicted in FIG. 1, the worker robot 130 may include wheels. However, other configurations for providing mobility are possible as well (e.g., biped devices, quadruped devices, treads, tracks, etc.).

The mover robot 120 may be a robotic device configured to move items throughout the worksite coordinate frame 100. For example, the mover robot 120 may be configured to move the construction materials 140 from one location within the worksite coordinate frame 100 to another. Further, the mover robot 120 may be capable of moving throughout the worksite. For example, as depicted in FIG. 1, the mover robot 120 may include wheels. However, other configurations for providing mobility are possible as well (e.g., biped devices, quadruped devices, treads, tracks, etc.).

The observer robots 110 may be configured to move about the worksite coordinate frame 100. For example, as depicted in FIG. 1, the observer robots 110 may be biped robotic devices capable of walking throughout the worksite coordinate frame 100. Alternatively, the observer robots 110 may include wheels, tracks, treads, or any other component that provides mobility.

The observer robots 110 may include sensors that facilitate tracking the location of target objects within the worksite coordinate frame 100. For example, the observer robots 110 may include laser tracker systems to track the location of the mover robot 120, worker robot 130, and construction materials 140 within the worksite coordinate frame 100. Laser trackers may be used to measure the location of objects by directing a laser beam at a retroreflective marker attached to the measured object. Light reflects off the retroreflective marker and returns to the laser tracker. The laser tracker may determine the location of the marker based on characteristics of the reflected light. Laser trackers may measure location with very high accuracy, but the measurement data may be provided at a low refresh rate. For example, a laser tracker may measure the location of an object several meters away with a resolution of a few hundredths of a millimeter, but the measurement may be provided at a refresh rate of the order of a few hertz.

In FIG. 1, the worksite coordinate frame 100 includes a number of pylon markers 104. The pylon markers 104 may be located at the boundaries of the worksite coordinate frame 100 and/or throughout the worksite coordinate frame 100 and may be used to establish a three-dimensional coordinate system 102 within the worksite coordinate frame 100. For example, the three-dimensional coordinate system 102 may be a Cartesian coordinate system with an x-axis, a y-axis, and a z-axis. One of the pylon markers 104 may be designated as the origin of the coordinate system 102, and the remaining pylon markers 104 may be spaced a known distance from the origin. As a result, each of the pylon markers 104 may be associated with a known (x, y, z) coordinate within the coordinate system 102, where the x-, y-, and z-coordinates correspond to a distance from the origin pylon marker along the x-, y-, and z-axes respectively.

The pylon markers 104 do not necessarily need to be located at the boundaries of the worksite coordinate frame 100, but may alternatively or additionally be arranged at various known locations throughout the worksite coordinate frame 100. For example, in some embodiments, the pylon markers 104 may be arranged in a two-dimensional or three-dimensional grid throughout the worksite. However, other configurations are possible as well, and the pylon markers 104 may be arranged in any manner of known locations in the worksite coordinate frame 100.

The pylon markers 104 may be retroreflective such that the laser tracker of an observer robot 110 may measure the location of the pylon markers 104 with respect to the observer robot 110. By determining the location of a pylon marker with known coordinates from an observer robot 110, the coordinates of the observer robot 110 may be derived. As an observer robot 110 moves about the worksite coordinate frame 100, it may occasionally provide a line of sight between its laser tracker and a pylon marker 104. This provides updated coordinates for the location of the observer robot 110 as it moves about the worksite coordinate frame 100.

In addition to the pylon markers 104, the worksite coordinate frame 100 may include a number of additional markers 112. The markers 112 may be attached to various target objects throughout the worksite coordinate frame 100. For example, as depicted in FIG. 1, respective markers 112 may be attached to the observer robots 110, the mover robot 120, the worker robot 130, and/or the construction materials 140. The location of the markers 112 may be measured to provide coordinates within the coordinate system 102 associated with the mover robot 120, worker robot 130, and/or construction materials 140. For example, as depicted in FIG. 1, a laser tracker in an observer robot 110 may direct a laser toward a retroreflective marker 112 attached to the mover robot 120 along a line of sight 114. By analyzing the reflected light, the laser tracker may determine the position of the retroreflective marker 112 with respect to the observer robot 110. Since the coordinates of the observer robot 110 within the coordinate system 102 are known, the position of the retroreflective marker 112 with respect to the observer robot 110 may be used to determine coordinates of the retroreflective marker 112 within the coordinate system 102. By determining coordinates of the markers 112, the locations of the mover robot 120, worker robot 130, and construction materials 140 within the worksite coordinate frame 100 may be tracked.

Similarly, an observer robot 110 may provide a line of sight 116 between itself and another observer robot. In this manner, the observer robots 110 may facilitate determining the location of other observer robots 110, and the location of the observer robots 110 within the worksite coordinate frame 100 may be tracked.

In some embodiments, determining the location of a target object in the worksite coordinate frame 100 may involve more than simply determining the location of a single point within a three-dimensional coordinate system. For instance, in some embodiments, the locations of a set of points may be determined to define a volume of the target object. For example, referring to FIG. 1, a three-dimensional space representing the volume of the construction materials 140 may be determined. The observer robots 110 may determine the locations of a set of markers 112 attached to the construction materials 140. The markers 112 may be attached to the boundaries or edges of the construction materials 140, or in some embodiments, the markers 112 may be arranged on the construction materials 140 in any known manner. By determining the location of the set of markers 112 arranged on the construction materials 140, the location of a three-dimensional volume may be determined indicating a shape of the construction materials 140 within the worksite coordinate frame 100. Similarly, by determining the locations of sets of markers 112 arranged on various target objects, three-dimensional volumes and their positions within the worksite coordinate frame 100 may be determined for the mover robot 120, the worker robot 130, the observer robots 110, or any other object in the worksite coordinate frame 100.

In some embodiments, determining the location of a target object in the worksite coordinate frame 100 may include determining a pose of the target object relative to the worksite coordinate frame 100. The pose of the target object may include a combination of the position and orientation of the object. Various processes may be used to determine the pose of a target object, including analytic or geometric methods, genetic algorithm methods, and/or learning-based methods, among others.

In some embodiments, where the target object is a robotic device, the pose of the robot may be determined based on its operational state. The robotic device may have various operational states that result in different poses. A control system may determine the operational state of the robotic device. Given that the volume and/or shape of the robotic device is already known or has otherwise been determined, the control system may determine the pose of the robotic device based on the determined operational state.

For example, referring to FIG. 1, the worker robot 130 includes a robotic arm that may be positioned in any number of poses based on its operational state. One operational state may include configuring the robotic arm to perform a task on a work surface. However, an operational state may include any configuration of a robotic device in the worksite coordinate frame 100 that results in an associated pose. The volume and shape of the various components of the robotic arm are known or have otherwise been determined. Thus, by determining the pose (e.g., the position and orientation) of the robotic arm based on the operational state of the worker robot 130, a three-dimensional volume representing the space occupied by the robotic arm within the worksite coordinate frame 100 may be determined.

B. Example Robotic Control Systems

Figure 2:
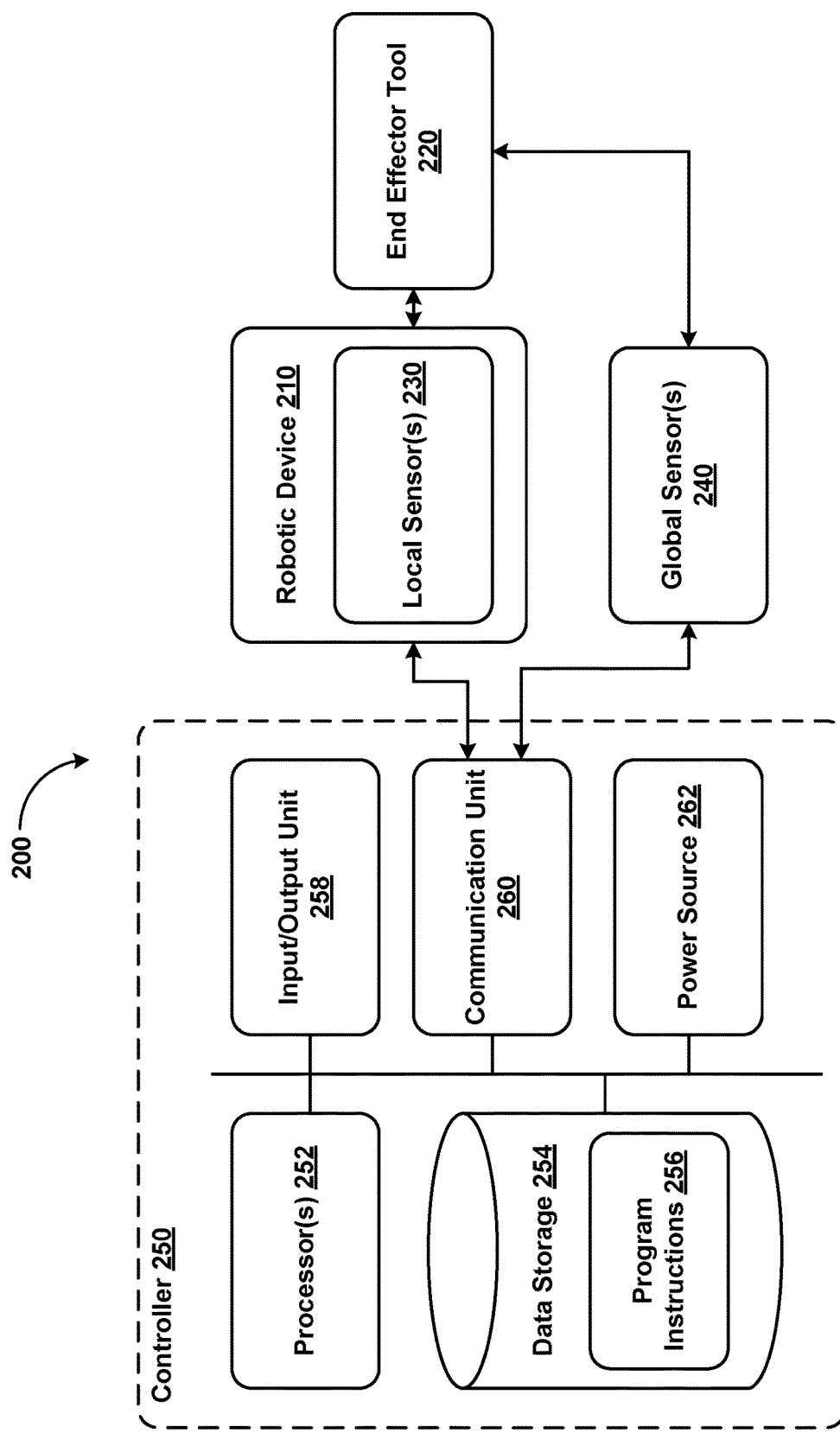
FIG. 2 is a simplified block diagram depicting components of a robotic device control system, according to an example embodiment.

FIG. 2 is a simplified block diagram depicting components of a robotic device control system 200, according to an example embodiment. The robotic device control system 200 includes a robotic device 210 configured to manipulate an end effector tool 220. The end effector tool 220 may be configured to perform a task on a work surface and may be mounted to a moveable component, such as a robotic arm, of the robotic device 210. The robotic device 210 may be located within a worksite coordinate frame, such as the worksite coordinate frame 100 depicted in FIG. 1, and the robotic device 210 may, for example, be a worker robot, such as the worker robot 130 depicted in FIG. 1.

The robotic device control system 200 may further include local sensor(s) 230 and global sensor(s) 240 configured to determine the location of various objects in the coordinate frame of a worksite, such as the end effector tool 220, for example. The local sensor(s) 230 may be arranged on or within the robotic device 210 and may be configured to measure the location of the end effector tool 220 with respect to the work surface. The global sensor(s) 240, on the other hand, may be arranged within the worksite coordinate frame separate from the robotic device 210 and may be configured to measure the location of the end effector tool 220 with respect to the worksite coordinate frame.

The local sensor(s) 230 may provide location measurements of the end effector tool 220 at a higher refresh rate than the global sensor(s) 240, but may not be as accurate due to lower sensor resolution and/or error buildup. For example, the global sensor(s) 240 may include a laser tracker system with very high resolution (e.g., hundredths of a millimeter) and a low refresh rate (e.g., a few hertz), such as the laser tracker system included in the observer robots 110 in FIG. 1. And the local sensor(s) 230 may include a high speed camera for providing optical flow data or an inertial measurement unit (IMU) with a high refresh rate (e.g., 250 Hz for the camera and 1 kHz for the IMU) but lower accuracy due to drift and accumulation of error over time.

The global sensor(s) 240 are not limited to laser tracker systems, but may include any sensor capable of measuring the location of the end effector tool 220 with respect to the worksite coordinate frame, such as motion capture sensors, light detection and ranging (LIDAR) sensors, point cloud sensors, ultrasonic range sensors, Global Positioning System (GPS) receivers, sonar, optical sensors, Radio Frequency identification (RFID) systems, Near Field Communication (NFC) chips, wireless sensors, radio sensors, radars, cameras (e.g., color cameras, grayscale cameras, and/or infrared cameras), and/or range sensors (e.g., ultrasonic and/or infrared), among others.

Similarly, the local sensor(s) 230 are not limited to high speed cameras or IMUS, but may include any sensor capable of measuring the location of the end effector tool 220 with respect to the work surface, such as force sensors, proximity sensors, motion sensors (e.g., gyroscopes, and/or accelerometers), load sensors, position sensors, thermal imaging sensors, depth sensors (e.g., RGB-D, laser, structured-light, and/or a time-of-flight camera), ultrasonic range sensors, infrared sensors, optical sensors, Radio Frequency identification (RFID) systems, Near Field Communication (NFC) chips, wireless sensors, light sensors, touch sensors (e.g., capacitive sensors), cameras (e.g., color cameras, grayscale cameras, and/or infrared cameras), and/or range sensors (e.g., ultrasonic and/or infrared), among others.

Additionally, the local sensor(s) 230 and global sensor(s) 240 may be positioned within or in the vicinity of the worksite coordinate frame, among other possible locations. For example, the local sensor(s) 230 may be attached to the robotic device 210, and the global sensor(s) 240 may be attached to a different robotic device capable of moving throughout the worksite coordinate frame, such as the observer robots 110 depicted in FIG. 1. In some embodiments, the global sensor(s) 240 may be arranged in fixed locations throughout the worksite coordinate frame, for example, as a dedicated sensing installation. Further, an example implementation may also use sensors incorporated within existing devices, such as mobile phones, laptops, and/or tablets. These devices may be in possession of people located in the worksite coordinate frame, such as construction workers in a construction site.

FIG. 2 also depicts a controller 250 that may receive data from the local sensor(s) 230 and global sensor(s) 240. In particular, the local sensor(s) 230 and global sensor(s) 240 may provide sensor data to the controller 250 through a communication unit 260. The communication unit 260 may include wired links and/or wireless links (e.g., using various wireless transmitters and receivers). A wired link may include, for example, a parallel bus or a serial bus such as a Universal Serial Bus (USB). A wireless link may include, for example, Bluetooth, IEEE 802.11(IEEE 802.11 may refer to IEEE 802.11-2007, IEEE 802.11n-2009, or any other IEEE 802.11 revision), Cellular (such as GSM, GPRS, CDMA, UMTS, EV-DO, WiMAX, HSPDA, or LTE), or Zigbee, among other possibilities. Furthermore, multiple wired and/or wireless protocols may be used, such as "3G" or "4G" data connectivity using a cellular communication protocol (e.g., CDMA, GSM, or WiMAX, as well as for "WiFi" connectivity using 802.11).

In other examples, the robotic control system 200 may include access points through which the local sensor(s) 230 and global sensor(s) 240 and/or controller 250 may communicate with a cloud server. Access points may take various forms such as the form of a wireless access point (WAP) or wireless router. Further, if a connection is made using a cellular air-interface protocol, such as a CDMA or GSM protocol, an access point may be a base station in a cellular network that provides Internet connectivity via the cellular network. Other examples are also possible.

The controller 250 is shown to include one or more processor(s) 252, data storage 254, program instructions 256, an input/output unit 258, and a power source 262. Note that the controller 250 is shown for illustration purposes only, as the controller 250 may include additional components and/or have one or more components removed without departing from the scope of the disclosure. Further, note that the various components of the controller 250 may be arranged and connected in any manner. The controller 250 may be incorporated in whole or in part into the robotic device 210 or may take the form of a desktop computer, a laptop, a tablet, a wearable computing device, and/or a mobile phone, among other possibilities.

Each processor, from the one or more processor(s) 252, may be a general-purpose processor or a special purpose processor (e.g., digital signal processors, application specific integrated circuits, etc.). The processor(s) 252 can be configured to execute computer-readable program instructions 256 that are stored in the data storage 254 and are executable to provide the functionality of the controller 250 described herein. For instance, the program instructions 256 may be executable to provide for processing of sensor data received from the local sensor(s) 230 and global sensor(s) 240.

The data storage 254 may include or take the form of one or more computer-readable storage media that can be read or accessed by the processor(s) 252. The one or more computer-readable storage media can include volatile and/or non-volatile storage components, such as optical, magnetic, organic or other memory or disc storage, which can be integrated in whole or in part with the processor(s) 252. In some embodiments, the data storage 254 can be implemented using a single physical device (e.g., one optical, magnetic, organic or other memory or disc storage unit), while in other embodiments, the data storage 254 can be implemented using two or more physical devices. Further, in addition to the computer-readable program instructions 256, the data storage 254 may include additional data such as diagnostic data, among other possibilities. Further, the controller 250 may also include a power source 262 configured to supply power to various components of the controller 250. Any type of power source may be used, such as direct current from a battery or alternating current from mains electricity.

FIG. 2 further depicts the controller 250 including an input/output unit 258. The input/output unit 258 may output information to a user through a display. The display may take on any form and may be arranged to project images and/or graphics to a user of the controller 250. In an example arrangement, a projector within the input/output unit 258 may be configured to project various projections of images and/or graphics onto a surface of the display. The display may include: an opaque or a transparent (or semi-transparent) matrix display, such as an electroluminescent display or a liquid crystal display, one or more waveguides for delivering an image to the user's eyes, or other optical elements capable of delivering an image to the user. A corresponding display driver may be disposed within the controller 250 for driving such a matrix display. Other arrangements may also be possible for the display. As such, the display may show a graphical user interface (GUI) that may provide an application through which the user may interact with the systems disclosed herein.

Additionally, the input/output unit 258 may receive user-input (e.g., from the user of the controller 250). In particular, the input/output unit 258 may allow for interaction with the GUI such as for scrolling, providing text, and/or selecting various features of the application, among other possible interactions. The input/output unit 258 may take on various forms. In one example, the input/output unit 258 may include a pointing device such as a computing mouse used for control of the GUI. However, if the input/output unit 258 includes a touch screen display, touch-input can be received (e.g., such as using a finger or a stylus) that allows for control of the GUI. In another example, the input/output unit 258 may include a keyboard that provides for selection of numbers, characters and/or symbols to be displayed via the GUI. For instance, in the arrangement where the input/output unit 258 includes a touch screen display, portions the display may show the keyboard. Thus, touch-input on the portion of the display including the keyboard may result in user-input such as selection of specific numbers, characters, and/or symbols to be shown on the GUI through the display. In yet another example, the input/output unit 258 may include a voice input device that receives audio input, such as from a user through a microphone, that is then interpretable using one of various speech recognition techniques into one or more characters that may be shown through the display. Other examples may also be possible.

C. Example Robotic Device

Figure 3:
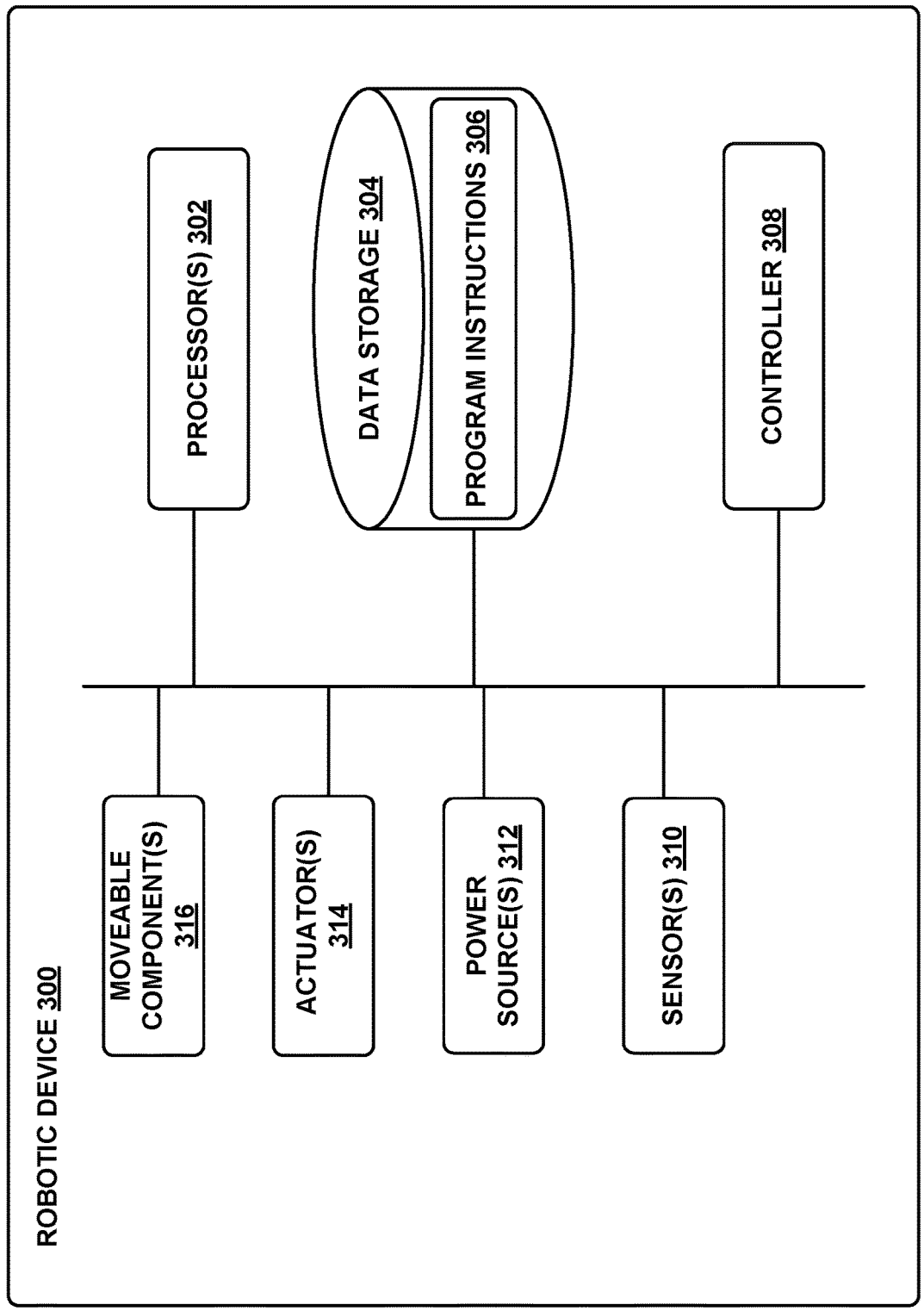
FIG. 3 is a simplified block diagram depicting components of a robotic device, according to an example embodiment.

FIG. 3 shows an example configuration of a robotic device 300, which could take the form an observer robot 110, a mover robot 120, or a worker robot 130, among other possibilities. Generally, a robotic device 300 may be any device that has a computing ability and interacts with its surroundings with an actuation capability and/or with ability to emit/generate physical phenomena such as light and/or sound, among others. For instance, the robotic device 300 may be a humanoid robot, a robotic arm, or a quadruped robot, among others. A robotic device may also be any device that is generally understood to those of ordinary skill in the art as being a "robotic." The robotic device 300 may also be referred to as a robotic device, a robotic manipulator, a robot client, or a robot, among others.

The robotic device 300 is shown to include processor(s) 302, data storage 304, program instructions 306, controller 308, sensor(s) 310, power source(s) 312, actuator(s) 314, and movable component(s) 316. Note that the robotic device 300 is shown for illustration purposes only and robotic device 300 may include additional components and/or have one or more components removed without departing from the scope of the disclosure. Further, note that the various components of robotic device 300 may be arranged and connected in any manner.

Moreover, the above description of processor(s) 252, data storage 254, program instructions 256, sensors (e.g., local sensor(s) 230 and global sensor(s) 240), and/or power source 262, may apply to any discussion below relating to the respective component being used in another system or arrangements. For instance, as noted, FIG. 3 (among other possible figures) illustrates processors, data storage, program instructions, sensors, and/or power as being incorporated in another arrangement. These components at issue may thus take on the same or similar characteristics (and/or form) as the respective components discussed above in association with FIG. 2. However, the components at issue could also take on other characteristics (and/or form) without departing from the scope of the disclosure.

As noted, the robotic device 300 may include a controller 308 (e.g., taking the form of a microcontroller). The controller 308 may include processing unit and data storage, and may be arranged to manage or carry out various operations (e.g., individually or in collaboration with processor(s) 302). Thus, this controller 308 could take on the same or similar characteristics (and/or form) as the above-mentioned controller 250, but could take on other characteristics (and/or form) as well. So in some implementations, the controller 250 may be incorporated as part the robotic device 300 and thus controller 250 may itself be controller 308. In other implementation, controller 308 may be included as part of the robotic device 300 and controller 250 may be separate from the robotic device 400. Regardless of the implementations, these controllers may take various forms. For instance, a controller may take the form of a chip set, a server system, a digital signal processor, a programmable logic controller, and/or a sampled-data system, among other possibilities. Moreover, a controller could also be referred to herein as a control system, among other.

Additionally, the robotic device 300 may also include one or more actuator(s) 314. An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, hydraulics, or electricity, among other possibilities. With this arrangement, actuator(s) 314 may cause movement of various movable component(s) 316 of the robotic device 300. The moveable component(s) 316 may include appendages/members such as robotic arms, legs, and/or hands, among others. The moveable component(s) 316 may also include a movable base, wheels, and/or end effectors, among others. Further, when a robotic device 300 includes at least one end effector, such an end effector may be a tool (e.g., a screwdriver, drill, welding iron, or some combination thereof) and/or a gripper, among others as discussed above.

D. Example Multi-Resolution Localization Systems and Methods

Figure 4:
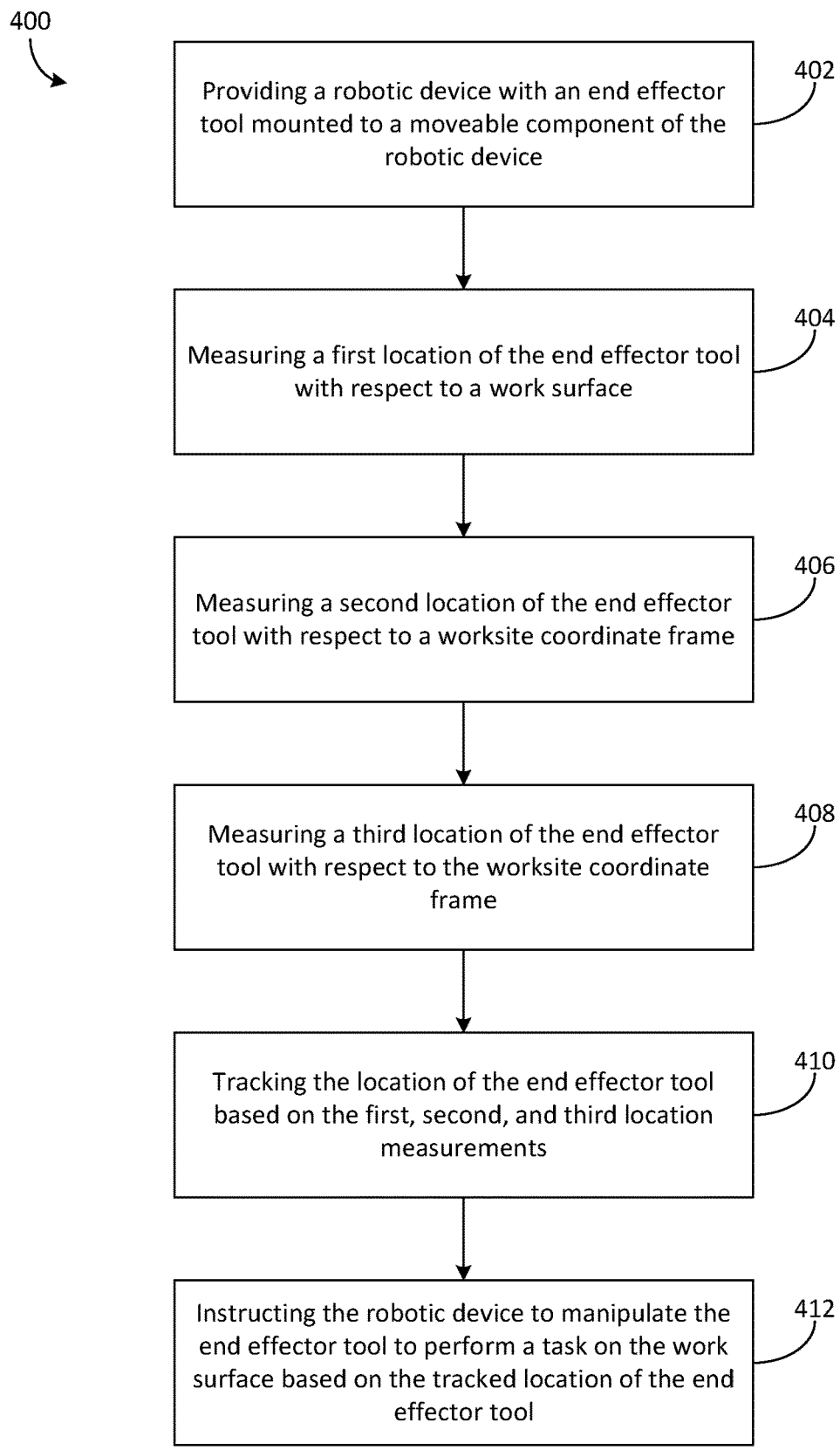
FIG. 4 depicts a flowchart of a method according to an example embodiment.

FIG. 4 depicts a flowchart of a method 400 according to an example embodiment. The method 400 may be implemented to track the location of an end effector tool of a robotic device.

Step 402 involves providing a robotic device with an end effector tool mounted to a moveable component of the robotic device. The robotic device may take the form of the robotic device 300 depicted in FIG. 3, or, more specifically, the robotic device may take the form of the worker robot 130 depicted in FIG. 1. The end effector tool may be configured to perform a task on a work surface located within a worksite coordinate frame, such as the worksite coordinate frame 100 depicted in FIG. 1.

Step 404 involves measuring a first location of the end effector tool with respect to the work surface. The first location may be determined based on location data provided by a local sensor, such as one of the local sensor(s) 230 depicted in FIG. 2. The first location data may be provided at a high refresh rate (e.g., 250 Hz or higher), but may have a low spatial accuracy due to error accumulation and/or low precision sensors. For example, the first location may be determined by performing a dead reckoning analysis on optical flow data provided by a camera mounted on the robotic device, as described in more detail below with reference to FIGS. 6 and 7.

Step 406 involves measuring a second location of the end effector tool with respect to the worksite coordinate frame. The second location may be determined based on location data provided by a first global sensor, such as one of the global sensor(s) 240 depicted in FIG. 2. The second location data may be provided at a lower refresh rate (e.g., approximately 100 Hz) than the first location data, but may have a higher spatial accuracy than the first location data because it is not subject to error accumulation (and/or for other reasons). For example, the second location may be determined by applying motion capture processes to image data (e.g., video) captured by cameras in the worksite environment, as described in more detail below with reference to FIG. 5.

Step 408 involves measuring a third location of the end effector tool with respect to the worksite coordinate frame. The third location may be determined based on location data provided by a second global sensor, such as one of the global sensor(s) 240 depicted in FIG. 2. The third location data may be provided at a lower refresh rate (e.g., approximately 1 Hz) than the second location data, but may have a higher spatial accuracy than the second location data. The third location data may have a higher spatial accuracy because it is not subject to error accumulation, or is subject to comparatively less error accumulation, and is generated based on sensors providing higher precision data. For example, a laser tracker system, which provides highly accurate location information, may be implemented as the third source of location data as described in more detail below with reference to FIG. 5.

Step 410 involves tracking the location of the end effector tool based on the first, second, and third location measurements. This may involve first tracking the location of the end effector tool based on the first location measurement. The local sensor providing the first location measurement may provide the first location measurement at a high refresh rate. For example, the local sensor may be a camera providing optical flow data at a refresh rate of approximately 250 Hz. Over time, as the local sensor continues to provide location data, the first location measurement may become more inaccurate due to error accumulation, drift, and/or due to the precision tolerance of the local sensor.

The second location measurement may be used to correct for inaccuracies in the first location measurement. The first global sensor providing the second location measurement may provide second location measurement data at a lower refresh rate than the local sensor, but the second location data may have a higher spatial accuracy than the first location data. For example, the first global sensor may be a motion capture system. In example embodiments, "motion capture" systems utilize data captured from image sensors to triangulate the three-dimensional position of a target. The target may be indicated by markers, such as the markers 112 depicted in FIG. 1. A motion capture system may have a lower refresh rate (e.g., approximately 100 Hz) than the local sensor, but its spatial accuracy may be higher because it does not suffer from error accumulation. Therefore, the first global sensor may provide feedback data for a calibrating process that accounts and/or adjusts for errors in the locally measured first location data arising due to accumulated measurement error.

The third location measurement may of even higher precision, as compared to the second location measurement, but may be obtained less frequently due to a lower refresh rate. As such, the third location data may be utilized to correct for lower tolerances in the first global sensor measurements and/or accumulation of errors in locations data from local sensors. The second global sensor providing the third location measurement may provide third location data at a lower refresh rate than the first global sensor, but the third location data may have a higher spatial accuracy than the second location data. For example, the second global sensor may be a laser tracker system configured to provide location data of an object several meters away with a resolution of a few hundredths of a millimeter, but the location data may be provided at a refresh rate of the order of a few hertz or lower. Therefore, the second global sensor may serve as a calibrating feedback to account for the lower resolution of the first global sensor.

By determining the location of the end effector tool based on the combination of the first, second, and third location measurement data, method 400 can update location information for the end effector tool at a high rate (e.g., 250 Hz or higher) with a higher accuracy than would be possible using any single source of location information.

Figure 5:
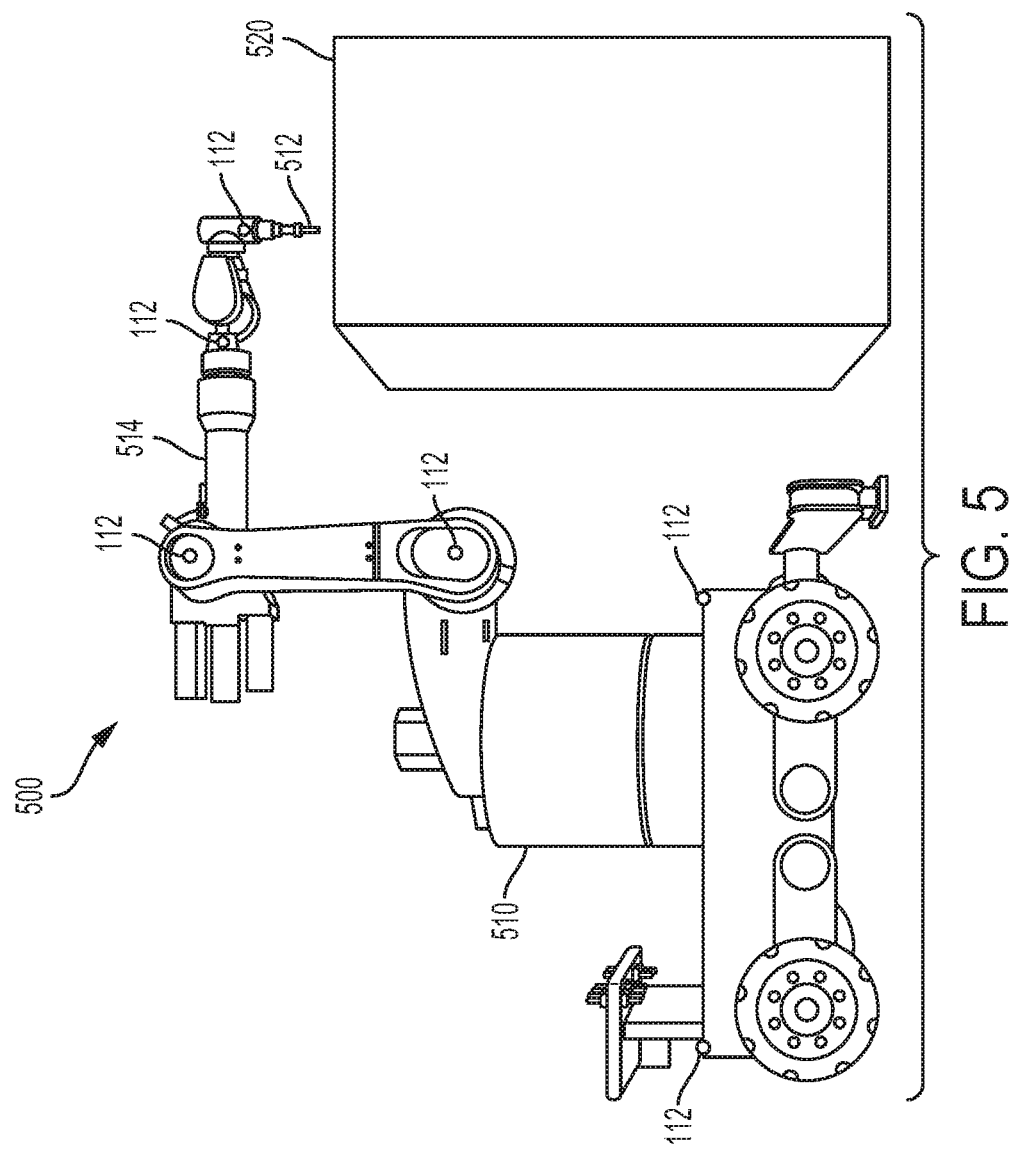
FIG. 5 depicts a global location measurement system according to an example embodiment.

FIG. 5 depicts a global location measurement system 500 according to an example embodiment. The global location measurement system may be configured to measure the location of an end effector tool 512 with respect to a worksite coordinate frame, such as the worksite coordinate frame 100 depicted in FIG. 1. The end effector tool 512 may be configured to perform a task on a work surface 510 and may be mounted on a moveable component, such as a robotic arm 514, of a robotic device 510. The robotic device 510 may be the robotic device 300 depicted in FIG. 3, or more specifically, the robotic device may be the worker robot 130 depicted in FIG. 1.

The global location measurement system 500 may include one or more markers 112. The markers 112 may be mounted at various locations on the robotic device 510, such as on corners of a base of the robotic device 510, on joints of the robotic arm 514, on the end effector tool 512, and/or on some other location of the robotic device 510.

The global location measurement system 500 may further include a global sensor (not shown), such as the global sensor(s) 240 depicted in FIG. 2. In some embodiments, the markers 112 may be retroreflective markers, and the global location measurement system 500 may include a laser tracker for tracking the retroreflective markers 112. The laser tracker may be mounted on a moveable robot, such as the observer robot 110 depicted in FIG. 1. The observer robot 110 may direct a laser at a retroreflective pylon marker 104 with predetermined three-dimensional coordinates within the worksite coordinate frame 100. Based on the reflected light, the laser tracker may determine location data indicating the position of the pylon marker 104 with respect to the laser tracker. The location data may be communicated to a controller, such as the controller 250 depicted in FIG. 2. Based on the location data of the pylon marker 104, the controller 250 may determine three-dimensional coordinates of the laser tracker on the observer robot 110 within the worksite coordinate frame 100.

The observer robot 110 may further direct a laser at one of the retroreflective markers 112, such as a marker 112 mounted on the end effector tool 512. Based on the reflected light, the laser tracker may determine location data indicating the position of the marker 112 with respect to the laser tracker. The location data may be communicated to the controller 250, and, based on the location data, the controller 250 may determine three-dimensional coordinates of the marker 112 mounted on the end effector tool 512 within the worksite coordinate frame 100. The marker 112 may be affixed to the end effector tool 512 such that the marker 112 maintains a constant known position relative to the end effector tool 512. By determining the coordinates of the marker 112, the controller 250 may determine coordinates of the end effector tool 512 based on the known relative positions of the marker 112 and the end effector tool 512. Location data indicating the coordinates of the end effector tool 512 may be stored in the data storage 254 of the controller 250.

In some embodiments, there may not be a line of sight between the observer robot 110 and the marker 112 mounted on the end effector tool 512. For example, the end effector tool 512 may be performing a task on a work surface 520, and the robotic device 510 may manipulate the robotic arm 514 in a manner that moves the end effector tool 512 out of the line of sight of the observer robot 110. Without a line of sight, the laser tracker on the observer robot 110 may not measure the position of the marker 112 mounted on the end effector tool 512. To account for this, the robotic device 510 may be configured to occasionally manipulate the end effector tool 512 to restore a line of sight between the observer robot 110 and the marker 112 on the end effector tool 512.

For example, the controller 250 may store location data indicating the most recent measured position of the marker 112 on the end effector tool 512. When the line of sight between the observer robot 110 and the marker 112 on the end effector tool 512 is broken, the controller 250 may occasionally (e.g., once every 30 seconds) communicate instructions to the robotic device 510 to manipulate the end effector tool 512 in a manner that returns the marker 112 on the end effector tool 512 to the most recent measured position. Once the line of sight is restored, the laser tracker may measure the location of the marker 112 on the end effector tool 512, the observer bot 110 may communicate new location data indicating the position of the marker 112 on the end effector tool 512 to the controller 250, and the controller 250 may store the new location data in the data storage 254.

In some embodiments, the controller 250 may communicate instructions to the robotic device 510 to manipulate the end effector tool 512 to restore line of sight more frequently or less frequently than once every 30 seconds. The rate may be based on the accuracy of the local sensors 230. For example, if the local sensors 230 have a very low accuracy or large error due to error accumulation, then line of sight may be restored more frequently than once every 30 seconds. On the other hand, if the local sensors 230 have somewhat high accuracy or low error accumulation, then line of sight may be restored less frequently than once every 30 seconds.

In some embodiments, the controller 250 may communicate instructions to a worker robot in order to manipulate the worker robot to restore line of sight between an observer robot and the worker robot. In some embodiments, the controller 250 may communicate instructions to an observer robot in order to manipulate the observer robot to restore line of sight between the observer robot and a worker robot. Still, in some embodiments, the controller 250 may communicate instructions to both an observer robot and a worker robot to manipulate both the observer robot and the worker robot to restore line of sight between the observer robot and the worker robot.

In some embodiments, the global location measurement system 500 may include a motion capture system. The motion capture system may include cameras mounted on the observer robots 110 and may be configured to measure the position of the markers 112. For example, the global location measurement system 500 may include one or more reference markers (not shown) that may be mounted to fixed locations throughout the worksite coordinate frame 100. The motion capture system may measure the movement of the marker 112 on the end effector tool 512 with respect to the one or more reference markers. Data indicating the movement of the marker 112 with respect to the one or more reference markers may be communicated to the controller 250. Since the one or more reference markers may be mounted in fixed locations, they may have predetermined coordinates within the worksite coordinate frame 100. Based on the movement data indicating movement of the marker 112 on the end effector tool 512 and the predetermined coordinates of the one or more reference markers, the controller 250 may determine the coordinates of the marker 112 on the end effector tool within the worksite coordinate frame 100. Location data indicating the coordinates of the end effector tool 512 may be stored in the data storage 254 of the controller 250.

In some embodiments, the global location measurement system 500 may include a LIDAR sensor. The LIDAR sensor may be mounted on the observer robot 110 and may be configured to measure the position of the end effector tool 512 with respect to the worksite coordinate frame 100. For example, the LIDAR sensor may direct light toward the end effector tool and toward some fixed object with a known location and known coordinates within the worksite coordinate frame 100. By analyzing the reflected light, the LIDAR sensor may provide data indicating the position of the end effector tool 512 with respect to the fixed object. Based on the data indicating the position of the end effector tool 512 with respect to the fixed object, the controller 250 may determine coordinates of the end effector tool 512 within the worksite coordinate frame 100. Location data indicating the coordinates of the end effector tool 512 may be stored in the data storage 254 of the controller 250.

In some embodiments, the configuration of a global sensor 240 may be reversed. That is, the global sensor 240 may be mounted on a robotic device, such as on an end effector tool or some other component or linkage. In this configuration, the global sensor 240 may localize itself by scanning the environment around it. In some embodiments, the global sensor 240 may be localized by comparing the scan results to a known environmental model. In some embodiments, the global sensor 240 may be localized by performing simultaneous localization and mapping (SLAM), where a map of the environment is constructed while simultaneously keeping track of the global sensor's location within the environment.

Figure 6:
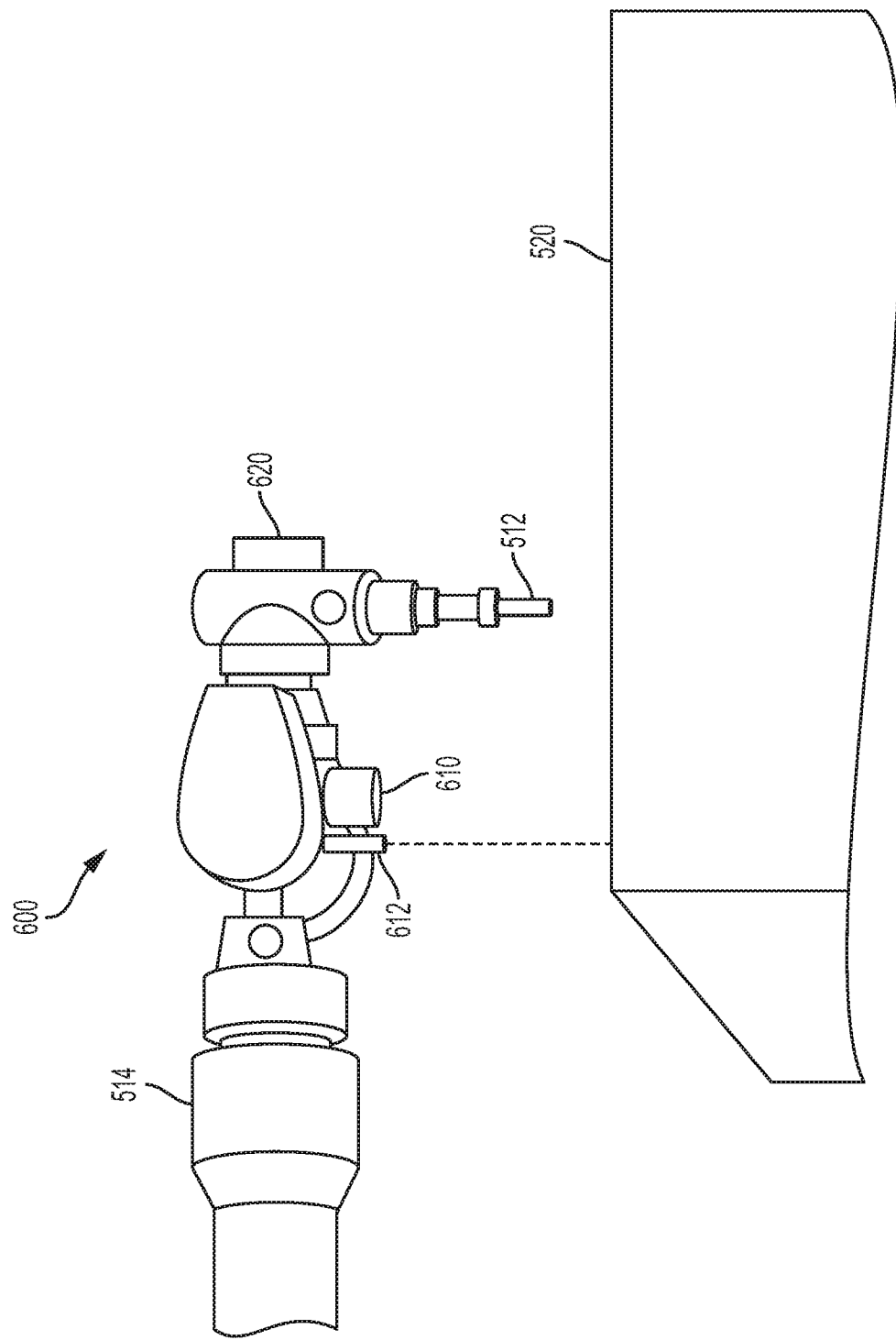
FIG. 6 depicts a local location measurement system according to an example embodiment.

FIG. 6 depicts a local location measurement system 600 according to an example embodiment. The local location measurement system 600 may be configured to measure the location of an end effector tool 512 with respect to a work surface 520, and the local location measurement system 600 may provide location data indicating the location of the end effector tool 512 at a higher refresh rate than the global location measurement system 500. The end effector tool 512 may be mounted to a robotic arm 514 of a robotic device. The robotic device may be the robotic device 300 depicted in FIG. 3, or more specifically, the robotic device may be the worker robot 130 depicted in FIG. 1. The local location measurement system may include a camera 610, a distance sensor 612, and a motion sensor 620.

The camera 610 may be arranged on the robotic arm 514 such that the work surface 520 is within the field of view of the camera 610 when the end effector tool 512 is performing a task on the work surface 520. For example, as depicted in FIG. 6, the camera 610 may be positioned adjacent to the end effector tool 512 with the lens directed toward the working end of the end effector tool 512. In some embodiments, the camera 610 may be located farther away from the end effector tool 512. For example, when the end effector tool 512 performing a task on the work surface causes poor visibility (e.g., due to dust from drilling, bright light from welding, or any other cause of poor visibility), it may be desirable to position the camera 610 on the robotic arm 514 farther away from the end effector tool 512, but close enough to the end effector tool 512 that the work surface 520 remains in the field of view of the camera 610.

The camera 610 may be configured to capture image data of the work surface 520. For example, the camera 610 may be a video camera configured to capture video of the work surface 520. The captured image data may be communicated to the controller 250 by a communication unit of the robotic device. The controller 250 may include program instructions 256 for performing optical flow analysis to determine the optical flow of the captured image data. As is understood by those skilled in the art, the "optical flow" of a video is the apparent motion of objects in the video that results from the relative movement between the object and the video camera.

Further, the controller 250 may use optical flow analysis to determine a location of the end effector tool 512 with respect to the work surface 520. For example, optical flow analysis may be used to determine movement of the camera 610 with respect to the work surface 520. Since the camera 610 and the end effector tool 512 may be adjacent to each other on the robotic arm 514, the movement of the camera 610 may be approximately the same as the movement of the end effector tool 512. The controller 250 may include program instructions for determining, based on the determined movement of the camera 610, a corresponding change in coordinates for the end effector tool 512 within the worksite coordinate frame 100. Location data indicating the new coordinates of the end effector tool 512 may be stored in the data storage 254 of the controller 250.

In order for the local location measurement system 600 to provide location data indicating the location of the end effector tool 512 at a higher refresh rate than the global location measurement system 500, the camera 610 may be a high speed camera. For example, the camera 610 may capture video of the work surface 520 at a frame rate of 250 frames per second or higher.

Many techniques for determining optical flow are well known to those skilled in the art. Such techniques include (i) phase correlation, (ii) block-based methods, (iii) differential methods such as the Lucas-Kanade optical flow method, the Horn-Schunk method, the Buxton-Buxton method, and the Black Jepson method, and (iv) discrete optimization methods, among others.

To determine optical flow at a given point in time, the controller 250 may apply the Lucas-Kanade method or any other appropriate technique to compare the optical flow between two video frames from the camera 610. In an exemplary embodiment, the determined optical flow may take the form of optical-flow data that is stored in the data storage 254. For a given optical-flow determination, the resulting optical-flow data may include a set of sample points that are identified by their coordinates within the video frame, and for each sample point, data indicating the magnitude and direction of the corresponding optical-flow vector at the sample point. Visually, the optical flow determined by the controller 250 may be two-dimensionally represented as an "optical-flow field," which shows the set of sample points within the video frame and the optical-flow vectors that indicate the respective optical flow at each sample point.

Figure 7:
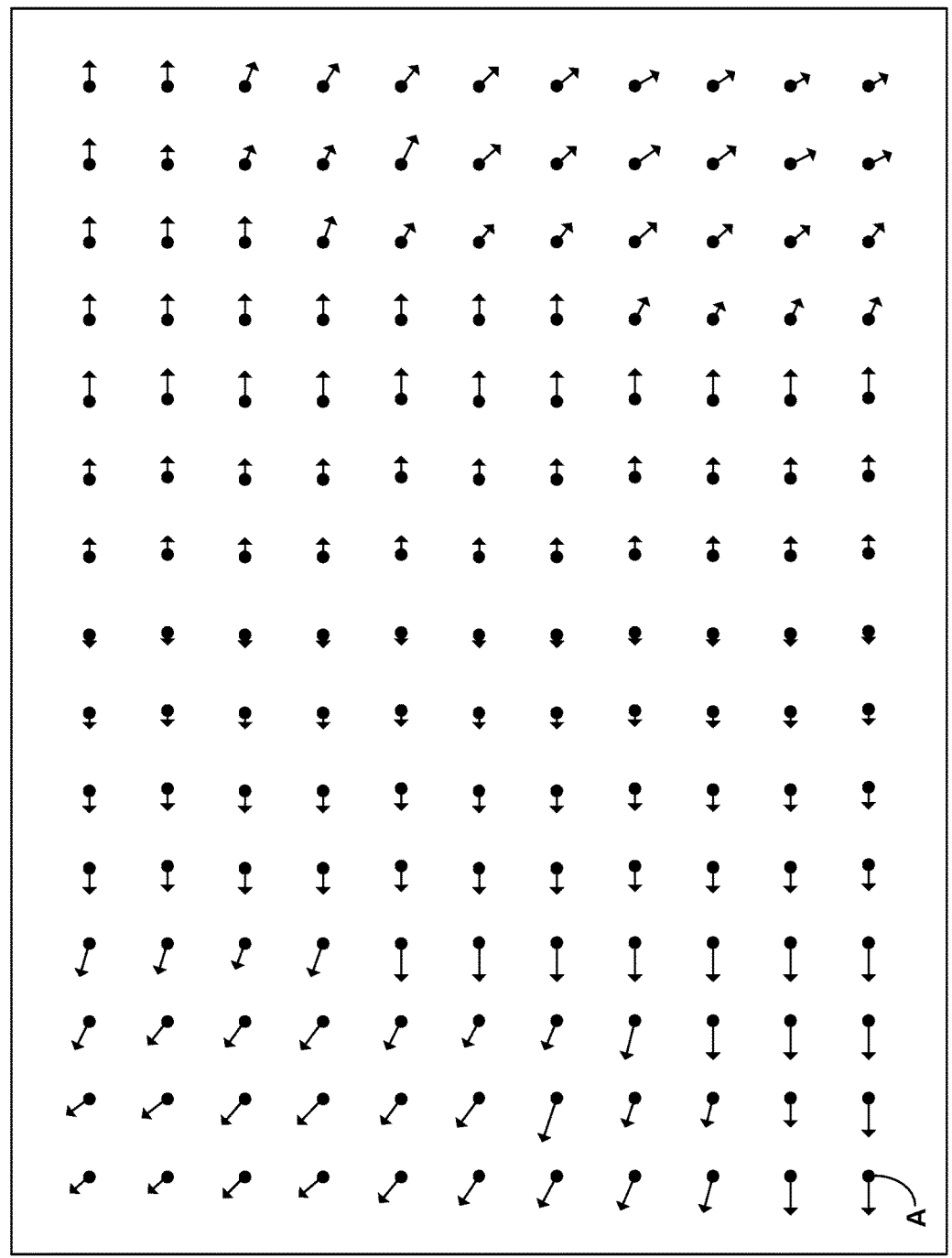
FIG. 7 depicts an illustration of an optical flow field according to an example embodiment.

FIG. 7 depicts an illustration of an optical flow field 700 according to an example embodiment. As shown, the optical flow field 700 includes sample points throughout the frame, with an optical flow vector that corresponds to each sample point indicating the magnitude and direction of the optical flow that is determined at the sample point.

Generally, each sample point in the optical flow field 700 corresponds to a certain pixel in the video frame from which the optical flow is derived. Therefore, the range of coordinate values for the samples points may be defined by the resolution of the video for which the optical flow is being determined. For instance, the example optical-flow field 700 provides the optical flow for video with a resolution of 640 pixels by 480 pixels ("640×480"). As such, each sample point in the optical flow field 700 may be identified by its respective coordinates within the 640×480 video frame. In the illustrated example, for instance, the sample points are arranged in an 11×15 grid, with coordinates ranging from [40, 40] at sample point A in the lower left corner, to [600, 440] in the upper right corner.

It should be understood that the number and arrangement of sample points in an optical flow field may vary as a matter of engineering design choice. For example, while an exemplary controller 250 may be configured to determine optical flow for the same number of sample points as shown in the optical flow field 700, the number of sample points may be increased to help increase the accuracy of the optical flow. Furthermore, while sample points in the optical flow field 700 are shown as being arranged in a grid and spaced by 40 pixels, the arrangement and spacing of sample points for which optical flow is determined may vary as a matter of engineering design choice. Yet further, the number of points for which an optical-flow vector is determined may vary depending on the particular technique for determining optical flow that is employed.

Referring back to FIG. 2, an exemplary controller 250 may be configured to receive a live video feed from local sensor(s) 230 (e.g., the camera 610 depicted in FIG. 6) and continually update and analyze the optical flow as frames of the video feed are received. As such, the controller 250 may continually monitor the optical flow to determine movement of the end effector tool 220 with respect to a work surface and store updated coordinates in the data storage 254 indicating the location of the end effector tool 220 within a worksite coordinate frame.

Employing optical flow analysis to determine a current location of the end effector tool 512 relies on dead reckoning techniques (i.e., the process of calculating a current position by using a previously determined position and advancing the previous position based upon known or estimated speeds over time and course). Dead reckoning is subject to error accumulation, and the local location measurement system 600 is therefore subject to error accumulation. On the other hand, the global location measurement system 500 measures the location of the end effector tool 512 with respect to the worksite coordinate frame rather than through dead reckoning. Thus, the global location measurement system 500 may be combined with the local measurement system 600 to remove the accumulated error from dead reckoning.

Referring back to FIG. 6, since optical flow analysis only provides two-dimensional movement information, the local location measurement system 600 may further include a distance sensor 612 to provide a third dimension of movement information. As depicted in FIG. 6, the distance sensor 612 may be a laser distance sensor. However, the distance sensor 612 may alternatively be any distance sensor configured to measure the distance between the distance sensor 612 and the work surface 520.

Since the optical flow analysis provides movement vectors for the two-dimensional axes formed by the field of view of the camera 610, the distance sensor 612 may be configured to measure the distance between the distance sensor 612 and the work surface 520 along an axis perpendicular to the field of view of the camera 610. In order to increase the accuracy of the distance sensor measurement, the distance sensor 612 may be mounted adjacent to the camera 610.

Distance data indicating the distance between the distance sensor 612 and the work surface 520 may be communicated to the controller 250. The controller 250 may include program instructions for determining, based on the determined distance data, a corresponding change in coordinates for the end effector tool 512 within the worksite coordinate frame 100. Location data indicating the current coordinates of the end effector tool 512 may be stored in the data storage 254 of the controller 250.

In some embodiments, the distance data may further be used to focus the camera 610. When the end effector tool 512 is performing a task on the work surface 520, the camera 610 may be moved closer to and farther from the work surface. Changing the distance between the camera 610 and the work surface 520 may cause the camera 610 to become unfocused. To account for this, the controller 250 may include program instructions for configuring the focal length of the camera 610 based on the distance data received from the distance sensor 612. For example, if the distance data indicates the camera 610 has moved closer to the work surface 520, the controller 250 may communicate instructions to the camera 610 to reduce the focal length of the camera 610 accordingly.

The local location measurement system 600 may further include a motion sensor 620. As depicted in FIG. 6, the motion sensor 620 may be mounted on the end effector tool 512. The motion sensor 620 may be any sensor configured to measure local movement of the end effector tool 512 at a high frequency. For example, the motion sensor 620 may be an IMU configured to provide data at a refresh rate of 1 kHz or higher. Further, while an IMU may provide data at a higher refresh rate than the optical flow analysis, an IMU may have a lower spatial accuracy due to error accumulation and lower precision sensors.

As is understood by those skilled in the art, an IMU may measure a body's specific force and angular rate using a combination of accelerometers and gyroscopes. Based on the specific force and angular rate measurements from the IMU, the controller 250 may include program instructions for determining a location of the IMU, and, consequently, the end effector tool 512, through dead reckoning. For example, known coordinates of the end effector tool 512 may be stored in the data storage 254. The known coordinates may be determined based on data from the global location measurement system 500 or from the camera 610 and distance sensor 612 in the local location measurement system 600. The IMU may provide data indicating the specific force and angular rate of the end effector tool 512. Based on the known coordinates and the specific force and angular rate of the end effector tool 512, the controller may determine current coordinates indicating a position of the end effector tool 512 within the worksite coordinate frame 100. Location data indicating the current coordinates of the end effector tool 512 may be stored in the data storage 254 of the controller 250.

Similar to the optical flow analysis, the dead reckoning process using data from the IMU is subject to error accumulation. The IMU may provide data at a higher refresh rate than the camera 610 (e.g., 1 kHz versus 250 Hz), and may therefore result in a larger error accumulation. Determining the current coordinates of the end effector tool 512 using optical flow analysis, due to its lower refresh rate and higher spatial accuracy, may remove some of the accumulated error resulting from measurements based on data from the IMU. Similarly, determining the current coordinates of the end effector tool 512 using data from the global location measurement system 500, due to the lower refresh rate and higher spatial accuracy of the global sensors 240, may remove the accumulated error resulting from measurements based on data from the local location measurement system 600.

Data provided by local sensor(s) 230, such as the motion sensor 620 or the camera 610, is not only at risk of error accumulation, but is also subject to error caused by drift. In example embodiments, drift occurs when the output of the local sensor(s) 230 changes over time independent from their location measurements. Drift may be caused by changes in temperature, electronics stabilizing, electronics aging, and/or imperfections in the local sensor(s) 230, among other causes.

Figure 8:
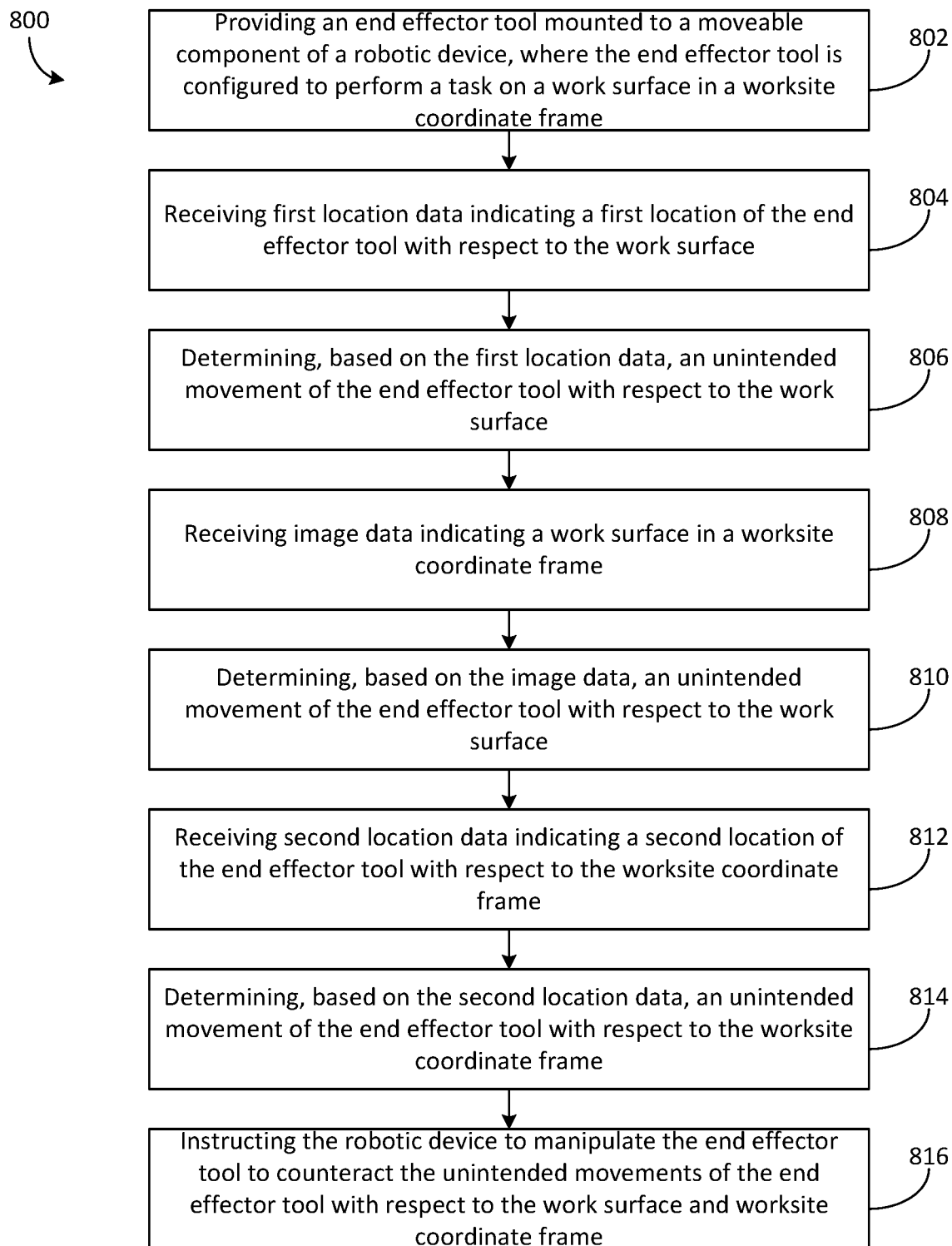
FIG. 8 depicts a flowchart of a method according to an example embodiment.

FIG. 8 depicts a flowchart of a method 800 according to an example embodiment. The method 800 may be implemented to determine an unintended movement of an end effector tool of a robotic device and stabilize the end effector tool based on the determined unintended movement. The unintended movement of the end effector tool may be any movement of the end effector tool that is not caused by a controller of the robotic device. For example, the unintended movement may be due to vibrations of the robotic device, the robotic device sinking into the ground, or any other unintentional movement of the end effector tool.

Step 802 involves providing an end effector tool mounted to a moveable component of a robotic device, where the end effector tool is configured to perform a task on a work surface in a worksite coordinate frame. The robotic device may be the robotic device 300 depicted in FIG. 3, or, more specifically, the robotic device may be the worker robot 130 depicted in FIG. 1. The worksite coordinate frame may be the worksite coordinate frame 100 depicted in FIG. 1.

Step 804 involves receiving first location data of the end effector tool with respect to a work surface. The first location data may be provided by a local location measurement system, such as the local location measurement system 600 depicted in FIG. 6. The first location data may be provided at a high refresh rate (e.g., 1 kHz or higher), but may have a low spatial accuracy due to error accumulation and/or low precision sensors. For example, the first location data may be data indicating the specific force and angular rate of the end effector tool, and it may be provided by an IMU, such as the motion sensor 620 depicted in FIG. 6.

Step 806 involves determining, based on the first location data, an unintended movement of the end effector tool with respect to the work surface. For example, the unintended movement may be determined through dead reckoning. Based on a known previous location and the data indicating the specific force and angular rate of the end effector tool, the controller 250 may determine a current location and velocity of the end effector tool.

Step 808 involves receiving image data indicating the work surface in the worksite coordinate frame. The image data may comprise a video recording of the work surface and it may be provided by a camera, such as the camera 610 depicted in FIG. 6. The image data may be provided at a lower refresh rate (e.g., 250 Hz) than the first location data, but may have a higher spatial accuracy than the first location data because it may not be subject to as much error accumulation.

Step 810 involves determining, based on the image data, an unintended movement of the end effector tool with respect to the work surface. For example, the unintended movement may be determined through optical flow analysis. The controller 250 may perform optical flow analysis to determine the unintended movement of the end effector tool with respect to the work surface.

Step 812 involves receiving second location data indicating a second location of the end effector tool with respect to the worksite coordinate frame. The second location data may be provided by the global location measurement system 500. The second location data may be provided at a lower refresh rate (e.g., approximately 1 Hz) than the image data but may have a higher spatial accuracy than the image data, because it is not subject to error accumulation and the sensor may have a much higher precision. For example, the second location data may be provided by a laser tracker system and may include data indicating the location of a marker on the end effector tool with respect to the laser tracker.

Step 814 involves determining, based on the second location data, an unintended movement of the end effector tool with respect to the worksite coordinate frame. For example, the controller 250 may store location data from the laser tracker in the data storage 254. The location data from the laser tracker may include the second location data as well as previous location data from the laser tracker indicating a prior location of the end effector tool. By determining the difference between the previous location data and the second location data, the controller 250 may determine an unintended movement of the end effector tool with respect to the worksite coordinate frame.

Step 816 involves instructing the robotic device to manipulate the end effector tool to counteract the unintended movements of the end effector tool with respect to the work surface and worksite coordinate frame. The controller 250 may communicate instructions to the robotic device to counteract the unintended movements determined based on the first location data, image data, and second location data. The determined unintended movement based on the first location data may be represented by a first vector with a magnitude and direction. In order to counteract this movement, the controller 250 may communicate first instructions to the robotic device to move the end effector tool in a manner having opposite magnitude and direction as the first vector. The first instructions may be provided at the same refresh rate as the first location data (e.g., 1 kHz or higher).

Similarly, the determined unintended movement based on the image data may be represented by a second vector with a magnitude and direction. The controller 250 may communicate second instructions to the robotic device to move the end effector tool in a manner having opposite magnitude and direction as the second vector. The second instructions may be provided at the same refresh rate as the image data (e.g., 250 Hz).

And the determined unintended movement based on the second location data may be represented by a third vector with a magnitude and direction. The controller 250 may communicate third instructions to the robotic device to move the end effector tool in a manner having opposite magnitude and direction as the third vector. The third instructions may be provided at the same refresh rate as the second location data (e.g., approximately 1 Hz).

By instructing the robotic device to move the end effector tool in an opposite manner as the determined unintended movements based on the first location data, image data, and second location data, the method 800 allows for stabilizing the end effector tool at a high rate (e.g., 1 kHz or higher) while providing more accurate stabilizing instructions at a lower rate (e.g., 250 Hz) to reduce cumulative measurement errors, and providing even higher accuracy stabilizing instructions at an even lower rate (e.g., 1 Hz) to remove cumulative measurement errors and account for lower resolution of the first location data and image data.

III. Conclusion

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A computer-implemented method comprising:
   receiving, from a robotic device that includes a sensor and an end effector tool, a location that is estimated for the end effector tool using sensor data that is generated by the sensor included on the robotic device;
   receiving, from each of first and second global sensors that are not included on the robotic device, a location that is estimated for the end effector tool using sensor data that is generated by the global sensor;
   determining an adjustment to apply to the end effector tool using (i) the location that is estimated for the end effector tool using the sensor data that is generated by the sensor included on the robotic device, (ii) the location that is estimated for the end effector tool using the sensor data that is generated by the first global sensor, and (iii) the location that is estimated for the end effector tool using the sensor data that is generated by the second global sensor; and
   providing, to the robotic device, an instruction to apply the adjustment to the end effector tool.

2. The method of claim 1, wherein the sensor included on the robotic device has a higher refresh rate and a lower spatial accuracy than both the first and second global sensors.

3. The method of claim 2, wherein the first global sensor has a higher refresh rate and a lower spatial accuracy than the second global sensor.

4. The method of claim 1, wherein the location that is estimated for the end effector tool using the sensor data that is generated by the sensor included on the robotic device is estimated using dead reckoning or optical flow.

5. The method of claim 1, wherein the locations that are estimated for the end effector tool using sensor data that is generated by first and second global sensors comprise locations of the end effector tool with respect to a worksite coordinate frame.

6. The method of claim 1, wherein the location that is estimated for the end effector tool using the sensor data that is generated by the sensor included on the robotic device comprises a location of the end effector tool with respect to a work surface.

7. The method of claim 1, wherein the first global sensor comprises a camera.

8. The method of claim 7, wherein the second global sensor comprises a laser tracker.

9. The method of claim 1, wherein the robotic device further includes markers for use by the second global sensor in generating the sensor data.

10. A system comprising:
one or more computers; and
a non-transitory computer-readable medium coupled to the one or more computers having instructions stored thereon which, when executed by the one or more computers, cause the one or more computers to perform operations comprising:
receiving, from a robotic device that includes a sensor and an end effector tool, a location that is estimated for the end effector tool using sensor data that is generated by the sensor included on the robotic device;
receiving, from each of first and second global sensors that are not included on the robotic device, a location that is estimated for the end effector tool using sensor data that is generated by the global sensor;
determining an adjustment to apply to the end effector tool using (i) the location that is estimated for the end effector tool using the sensor data that is generated by the sensor included on the robotic device, (ii) the location that is estimated for the end effector tool using the sensor data that is generated by the first global sensor, and (iii) the location that is estimated for the end effector tool using the sensor data that is generated by the second global sensor; and
providing, to the robotic device, an instruction to apply the adjustment to the end effector tool.

11. The system of claim 10, wherein the sensor included on the robotic device has a higher refresh rate and a lower spatial accuracy than both the first and second global sensors.

12. The system of claim 11, wherein the first global sensor has a higher refresh rate and a lower spatial accuracy than the second global sensor.

13. The system of claim 10, wherein the location that is estimated for the end effector tool using the sensor data that is generated by the sensor included on the robotic device is estimated using dead reckoning or optical flow.

14. The system of claim 10, wherein the locations that are estimated for the end effector tool using sensor data that is generated by first and second global sensors comprise locations of the end effector tool with respect to a worksite coordinate frame.

15. The system of claim 10, wherein the location that is estimated for the end effector tool using the sensor data that is generated by the sensor included on the robotic device comprises a location of the end effector tool with respect to a work surface.

16. The system of claim 10, wherein the first global sensor comprises a camera.

17. The system of claim 16, wherein the second global sensor comprises a laser tracker.

18. The system of claim 10, wherein the robotic device further includes markers for use by the second global sensor in generating the sensor data.

19. A non-transitory computer storage medium encoded with a computer program, the computer program comprising instructions that when executed by one or more processors cause the one or more processors to perform operations comprising:
receiving, from a robotic device that includes a sensor and an end effector tool, a location that is estimated for the end effector tool using sensor data that is generated by the sensor included on the robotic device;
receiving, from each of first and second global sensors that are not included on the robotic device, a location that is estimated for the end effector tool using sensor data that is generated by the global sensor;
determining an adjustment to apply to the end effector tool using (i) the location that is estimated for the end effector tool using the sensor data that is generated by the sensor included on the robotic device, (ii) the location that is estimated for the end effector tool using the sensor data that is generated by the first global sensor, and (iii) the location that is estimated for the end effector tool using the sensor data that is generated by the second global sensor; and
providing, to the robotic device, an instruction to apply the adjustment to the end effector tool.

20. The medium of claim 19, wherein:
the sensor included on the robotic device has a higher refresh rate and a lower spatial accuracy than both the first and second global sensors, and
the first global sensor has a higher refresh rate and a lower spatial accuracy than the second global sensor.

* * * * *